United States Patent
Majumdar et al.

(10) Patent No.: US 7,166,656 B2
(45) Date of Patent: *Jan. 23, 2007

(54) SMECTITE CLAY INTERCALATED WITH POLYETHER BLOCK POLYAMIDE COPOLYMER

(75) Inventors: Debasis Majumdar, Rochester, NY (US); Narasimharao Dontula, Rochester, NY (US); Thomas N. Blanton, Rochester, NY (US); Gary S. Freedman, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/008,810

(22) Filed: Nov. 13, 2001

(65) Prior Publication Data

US 2003/0100656 A1  May 29, 2003

(51) Int. Cl.
C08K 3/34 (2006.01)
C08J 9/22 (2006.01)
C08L 53/00 (2006.01)

(52) U.S. Cl. .............. 523/216; 524/445; 524/446; 524/447; 524/505

(58) Field of Classification Search ........... 524/445, 524/446, 447; 523/216
See application file for complete search history.

(56) References Cited

U.S. PATENT DOCUMENTS

| | | | |
|---|---|---|---|
| 4,115,475 A | 9/1978 | Foy et al. | |
| 4,195,015 A | 3/1980 | Deleens et al. | |
| 4,208,493 A | 6/1980 | Deleens et al. | |
| 4,230,838 A | 10/1980 | Foy et al. | |
| 4,238,582 A | 12/1980 | Deleens et al. | |
| 4,252,920 A | 2/1981 | Deleens et al. | |
| 4,331,786 A | 5/1982 | Foy et al. | |
| 4,332,920 A | 6/1982 | Foy et al. | |
| 4,739,007 A | 4/1988 | Okada et al. | |
| 4,810,734 A | 3/1989 | Kawasumi et al. | |
| 4,839,441 A | 6/1989 | Cuzin et al. | |
| 4,864,014 A | 9/1989 | Cuzin et al. | |
| 4,894,411 A | 1/1990 | Okada et al. | |
| 5,102,948 A | 4/1992 | Deguchi et al. | |
| 5,164,440 A | 11/1992 | Deguchi et al. | |
| 5,164,460 A | 11/1992 | Yano et al. | |
| 5,248,720 A | 9/1993 | Deguchi et al. | |
| 5,385,776 A | 1/1995 | Maxfield et al. | |
| 5,514,734 A | 5/1996 | Maxfield et al. | |
| 5,578,672 A | 11/1996 | Beall et al. | |
| 5,637,407 A | 6/1997 | Hert et al. | |
| 5,703,161 A | 12/1997 | Steenblock et al. | |
| 5,747,560 A | 5/1998 | Christiani et al. | |
| 5,804,613 A | 9/1998 | Beall et al. | |
| 5,807,796 A | 9/1998 | Degrand et al. | |
| 5,830,983 A | 11/1998 | Alex et al. | |
| 5,880,197 A | 3/1999 | Beall et al. | |
| 5,939,183 A * | 8/1999 | Kuratsuji et al. | 428/324 |
| 5,951,494 A | 9/1999 | Wang et al. | |
| 5,973,053 A | 10/1999 | Usuki et al. | |
| 5,998,545 A | 12/1999 | Melot et al. | |
| 6,063,505 A | 5/2000 | Kuratsuji et al. | |
| 6,133,375 A | 10/2000 | Betremieux et al. | |
| 6,183,382 B1 | 2/2001 | Kim et al. | |
| 6,203,920 B1 | 3/2001 | Bouilloux et al. | |
| 6,217,548 B1 | 4/2001 | Tsugita et al. | |
| 6,221,042 B1 | 4/2001 | Adams | |
| 6,251,128 B1 | 6/2001 | Knopp et al. | |
| 6,579,927 B1 * | 6/2003 | Fischer | 524/445 |
| 6,833,392 B1 * | 12/2004 | Acquarulo et al. | 522/83 |

FOREIGN PATENT DOCUMENTS

| | | |
|---|---|---|
| EP | 0 909 787 A | 4/1999 |
| WO | 00/34393 | 6/2000 |
| WO | 01/34685 A1 | 5/2001 |

OTHER PUBLICATIONS

A. Okada et al., Polym Prep., 1987, vol. 28, pp. 447-448.
Rachel Levy and C.W. Francis, Journal of Colloid And Interface Science, Mar. 1975, vol. 50 (3), 442-450.
D.J. Greenland, Journal of Colloid Science, vol. 18, 1963, pp. 647-664.
Richard A. Vaia et al., New Polymer Electrolyte Nanocomposites: Melt intercalation of polyethyleneoxide in mica type silicates, Advanced Materials, 7(2), 1995, pp. 154-156.
V. Mehrotra, E.P. Giannelis, Solid State Communications, 1991, vol. 77, No. 2, pp. 155-158.
Ed. T.J. Pinnavia and G.W. Beall, John Wiley & Sons, Ltd. Publishers, Polmer-Clay Nanocomposites, 2000.
H. van Olphen, John Wiley & Sons, Ltd. Publishers, An Introduction To Clay Colloid Chemistry, 1963, 1977.

* cited by examiner

*Primary Examiner*—Tae H Yoon
(74) *Attorney, Agent, or Firm*—Lynne M. Blank

(57) ABSTRACT

The present invention describes an intercalated clay intercalated with a polyether block polyamide copolymer. An article is included comprising a matrix polymer and an intercalated clay comprising clay intercalated with polyether block polyamide copolymer. The present invention also includes an article comprising polyether block polyamide copolymer and intercalated clay.

20 Claims, 1 Drawing Sheet

SMECTITE CLAY INTERCALATED WITH POLYETHER BLOCK POLYAMIDE COPOLYMER

CROSS REFERENCE TO RELATED APPLICATIONS

Reference is made to commonly assigned, co-pending U.S. Patent Applications:
Publication Number 2003/0099815 by Dontula et al., filed of even date herewith entitled "Ethoxylated Alcohol Intercalated Smectite Materials and Method";
Publication Number 2003/0100655 by Nair et al., filed of even date herewith entitled "Polyester Nanocomposites", and
Publication Number 2003/1418918 by Dontula et al., filed of even date herewith entitled "Article Utilizing Block Copolymer Intercalated Clay", the disclosures of which are incorporated herein.

FIELD OF THE INVENTION

The invention relates to layered materials such as clay, which are intercalated with polyether block polyamide copolymer.

BACKGROUND OF THE INVENTION

Over the last decade or so, the utility of inorganic nanoparticles as additives to enhance polymer performance has been well established. Ever since the seminal work conducted at Toyota Central Research Laboratories, polymer-clay nanocomposites have generated a lot of interest across industry. The unique physical properties of these nanocomposites have been explored by such varied industrial sectors as the automotive industry, the packaging industry, and plastics manufactures. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, etc. Some of the related prior art is illustrated in U.S. Pat. Nos. 4,739,007; 4,810,734; 4,894,411; 5,102,948; 5,164,440; 5,164,460; 5,248,720; 5,854,326; 6,034,163; etc.

In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures: (1) clay tactoids wherein the clay particles are in face-to-face aggregation with no organics inserted within the clay lattice; (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above.

Attempts to incorporate clay in engineering thermoplastics have been made in the past. However, most common thermoplastic materials do not intercalate or exfoliate clay by itself. To overcome this problem, organically modified clays are developed which are basically clays intercalated with organic molecules which are further dispersed in the matrix thermoplastic. In a typical process, the clay is first intercalated with an organic molecule, such as a surfactant molecule, and subsequently the intercalated clay is added to the thermoplastic during melt-processing. A vast majority of intercalated clays are produced by interacting anionic clays with cationic surfactants including onium species such as ammonium (primary, secondary, tertiary, and quaternary), phosphonium, or sulfonium derivatives of aliphatic, aromatic or arylaliphatic amines, phosphines and sulfides. These onium ions can cause intercalation in the clay through ion exchange with the metal cations present in the clay lattice for charge balance. However, these surfactant molecules may degrade during melt-processing, placing severe limitation on the melt-processing temperature. Moreover, the surfactant intercalation is usually carried out in the presence of water, which needs to be removed by a subsequent drying step, adding to the cost of the end product.

Intercalation of clay with a polymer, as opposed to a low molecular weight surfactant, is also known in the art. There are two major intercalation approaches that are generally used—intercalation of a suitable monomer followed by polymerization (known as in-situ polymerization, see A. Okada et. Al., *Polym Prep.*, Vol. 28, 447, 1987) or monomer/polymer intercalation from solution. Polyvinyl alcohol (PVA), polyvinyl pyrrolidone (PVP) and polyethylene oxide (PEO) have been used to intercalate the clay platelets with marginal success. As described by Levy et.al, in "Interlayer adsorption of polyvinylpyrrolidone on montmorillonite", *Journal of Colloid and Interface Science,* Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorrilonite", *Journal of Colloid Science,* Vol. 18, 647–664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute intercalated layered materials. In a recent work by Richard Vaia et.al., "New Polymer Electrolyte Nanocomposites: Melt intercalation of polyethyleneoxide in mica type silicates", *Adv. Materials,* 7(2), 154–156, 1995, PEO was intercalated into Na- montmorillonite and Li- montmorillonite by heating to 80° C. for 2–6 hours to achieve a d-spacing of 17.7° A. The extent of intercalation observed was identical to that obtained from solution (V. Mehrotra, E. P. Giannelis, *Solid State Commun.,* 77, 155, 1991). Other, recent work (U.S. Pat. No. 5,804,613) has dealt with sorption of monomeric organic compound having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalating monomer that contains an amine or amide functionality or mixtures thereof. In both these patents, and other patents issued to the same group, the intercalation is performed at very dilute clay concentrations in a medium such as water, leading to a necessary and costly drying step, prior to melt-processing.

Recently, polyether block polyamide copolymers have been identified to be a class of thermoplastic material with a wide range of specialty applications. One such family of copolymers has been developed by Elf Atochem as a product termed Pebax. The Pebax structure is described in the product literature to consist of a regular linear chain of rigid polyamide segments interspaced with flexible polyether segments. The various applications advertised for Pebax includes antistatic sheets or belts, food packaging materials, virus-proof surgical sheeting or garments, catheters, textiles as films for textile lamination for sports, leisure and workwear, footwear, gloves, water-resistant but breathable sheets, and many others. Some of these applications are disclosed in a number of patents such as U.S. Pat. Nos. 6,251,128; 6,221,042; 6,217,548; 6,203,920; 6,183,382; 6,133,375; 6,063,505; 5,951,494; 5,939,183; 5,807,796; 5,807,350; 5,662,975; 5,624,994; 5,614,588.

It is of great technical interest to further improve such a versatile material through the incorporation of nanoparticles, specifically layered materials such as clay, which can be intercalated and exfoliated in these copolymers without any further addenda. It is also of great interest to utilize these copolymers to intercalate and exfoliate nanoparticles such as clays and further disperse them in other matrix polymers of technical importance for enhancement of physical properties.

It is discovered that the aforementioned polyether block polyamide copolymers can easily intercalate clay by themselves during melt-processing, without requiring any other intercalating agent or solvent, forming the basis for nanocomposite materials of the instant invention.

SUMMARY OF THE INVENTION

It is an object of the invention to provide an intercalated clay. It is a further object of the invention to provide an article comprising the said intercalated clay and the said polyether block polyamide copolymer. It is an even further object of the invention to provide an article comprising the said intercalated clay and the said polyether block polyamide copolymer further dispersed in a matrix polymer.

These and other objects of the invention are accomplished by providing an intercalated clay intercalated with a polyether block polyamide copolymer. An article is included comprising a matrix polymer and an intercalated clay comprising clay intercalated with polyether block polyamide copolymer. The present invention also includes an article comprising polyether block polyamide copolymer and intercalated clay.

DETAILED DESCRIPTION OF THE INVENTION

Figure 1:
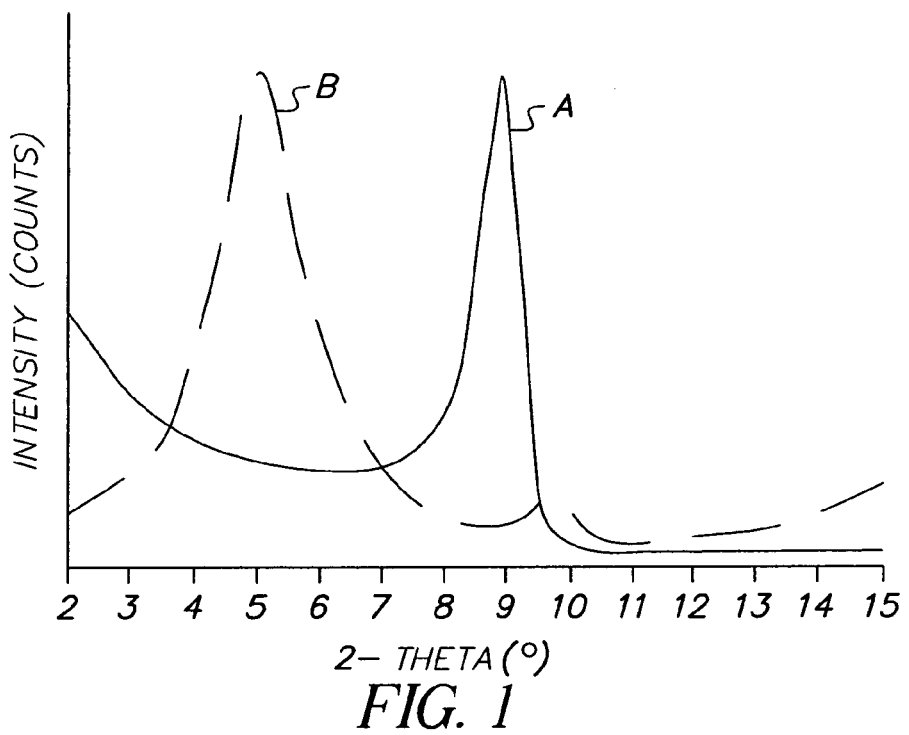
FIG. 1 represents the X-ray diffraction (XRD) pattern corresponding to the (001) basal plane spacing of clay for (A) Cloisite Na and (B) a film sample (Examiner. 1) comprising 10% of Cloisite Na and 90% of Pebax.

The invention has numerous advantages. It provides an intercalated clay which can be effectively incorporated in a polymer-clay nanocomposite. Such polymer-clay nanocomposites can be further incorporated in an article of engineering application with improved physical properties such as improved modulus, tensile strength, toughness, impact resistance, electrical conductivity, heat distortion temperature, coefficient of linear thermal expansion, fire retardance, oxygen and water vapor barrier properties, and the like. The application of such articles in a number of industrial sectors, such as automotive, packaging, battery, cosmetics, etc. have been elucidated in the literature (vide, for example, "Polymer-clay Nanocomposites," Ed. T. J. Pinnavia and G. W. Beall, John Wiley & Sons, Ltd. Publishers).

The invention has an additional advantage of intercalating the clay with a copolymer wherein one block is chosen to be a hydrophilic polymer, which is capable of intercalating the clay. The clay surface being hydrophilic, this block has a natural affinity to the clay surface and can readily enter the clay lattice and intercalate the clay. The aforesaid copolymer further comprises a block that is oleophilic. Such a design of the copolymer ensures that a component of the copolymer will intercalate the clay and another component will compatibilize the intercalated clay with a hydrophobic matrix polymer. Thus, two necessary criteria of effectively dispersing clay in a polymer to form a desirable polymer-clay nanocomposite, namely clay intercalation and compatibilization, can be fulfilled by the copolymer of this invention.

Another advantage of the invention arises from the fact that the polyether block polyamide copolymer can easily intercalate the clay by itself without requiring any other intercalating agent, which may limit the properties and processing of the end product.

Another advantage of the invention arises from the fact that the polyether block polyamide copolymer can intercalate the clay in an essentially dry state (i.e., without involving any solvent). This feature eliminates the need for a costly and time consuming drying step in the preparation of the intercalated clay.

Another advantage of the invention derives from the fact that the clay, polyether block polyamide copolymer and any other matrix polymer can all be combined in a single step in a suitable compounder, thus, adding greatly to the efficiency of the manufacturing process.

These and other advantages will be apparent from the detailed description below.

Whenever used in the specification the terms set forth shall have the following meaning:

"Nanocomposite" shall mean a composite material wherein at least one component comprises an inorganic phase, such as a smectite clay, with at least one dimension in the 0.1 to 100 nanometer range.

"Plates" shall mean particles with two comparable dimensions significantly greater than the third dimension, e.g., length and width of the particle being of comparable size but orders of magnitude greater than the thickness of the particle.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5–line23, col. 7).

"Intercalant" shall mean the aforesaid foreign molecule inserted between platelets of the aforesaid layered material.

"Exfoliation" or "delamination" shall mean separation of individual platelets in to a disordered structure without any stacking order.

"Intercalated" shall refer to layered material that has at least partially undergone intercalation and exfoliation.

"Organoclay" shall mean clay material modified by organic molecules.

The clay material suitable for this invention can comprise any inorganic phase desirably comprising layered materials in the shape of plates with significantly high aspect ratio. However, other shapes with high aspect ratio will also be advantageous, as per the invention. The clay materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic matrix polymers, are the layered hydrotalcites or double hydroxides, such as $Mg_6Al_{3.4}(OH)_{18.8}(CO_3)_{1.7}H_2O$, which have positively charged layers and exchangeable anions in the in the interlayer spaces. Other layered materials having little or no charge on the layers may be useful provided they can be intercalated with swelling agents, which expand their interlayer spacing. Such materials include chlorides such as $FeCl_3$, FeOCl, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4$—$2H_2O$, $CaPO_4CH_3$—$H_2O$, $MnHAsO_4$-$H_2O$, $Ag_6Mo_{10}O_{33}$ and the like. Preferred clays are swellable so that other agents, usually organic ions or molecules, can intercalate or exfoliate the layered material resulting in a desirable dispersion of the inorganic phase. These swellable clays include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clays include montmorillonite, hectorite and hydrotalcites, because of effectiveness in the present invention, and commercial availability of these materials.

The aforementioned clay can be natural or synthetic, for example, synthetic smectite clay. This distinction can influence the particle size and the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the clay particles should have a lateral dimension of between 0.01 µm and 5 µm, and preferably between 0.05 µm and 2 µm, and more preferably between 0.1 µm and 1 µm. The thickness or the vertical dimension of the clay particles can vary between 0.5 nm and 10 nm, and preferably between 1 nm and 5 nm. The aspect ratio, which is the ratio of the largest and smallest dimension of the clay particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, such as Southern Clay Products and Nanocor, which may be used in the practice of this invention.

The polyether block polyamide copolymer of the invention can be any copolymer comprising polyether block and polyamide block known in the art. Particularly suitable are those which are known for their excellent melt-processabilty while retaining their physical characteristics such as electrical conductivity, modulus, tensile strength, elongation at break, hardness, resistance to hydrolysis, breathability, virus-resistance, etc. One such preferred group of copolymers are represented by the product series Pebax, originally marketed by Elf Atochem and may be distributed under other product name and by other companies.

The copolymers having polyamide blocks and polyether blocks result from the copolycondensation of polyamide sequences having reactive ends with polyether sequences having reactive ends, such as, inter alia: 1) Polyamide sequences having diamine chain ends with polyoxyalkyene sequences having dicarboxylic chain ends. 2) Polyamide sequences having dicarboxylic chain ends with polyoxyalkylene sequences having diamine chain ends obtained by cyanoethylation and hydrogenation of aliphatic alpha, omega-dihydroxylated poloxyalkylene sequences, referred to as polyetherdiols. 3) Polyamide sequences having dicarboxylic chain ends with polyetherdiols, the products obtained being, in this particular case, polyetheresteramides.

The polyamide sequences having dicarboxylic chain ends originate, for example, from the condensation of alpha, omega-aminocarboxylic acids and lactams or of carboxylic diacids and diamines in the presence of a carboxylic diacide chain-limiting agent. Advantageously, the polyamide blocks are of polyamide 12 or polyamide 6, because of their effectiveness in the present invention and their superior physical properties and processability.

The polyamide blocks typically comprise condensation product of: one or a number of amino acids, such as aminocaproic, 7-aminoheptanoic, 11-aminoundecanoic and 12-aminododecanoic acids, or one or a number of lactams, such as caprolactam, oenantholactam and lauryllactam; one or a number of salts or mixtures of diamines, such as hexamethylenediamine, dodecamethylenediamine, meta-xylylenediamine, bis-(p-aminocyclohexyl)methane and trimethylhexamethylene-diamine, with diacids, such as isophthalic, terephthalic, adipic, azelaic, suberic, sebacic and dodecanedicarboxylic acids; or mixtures of some of these monomers, which result in copolyamides, for example polyamide 6/12 (or nylon 6/12) by condensation of caprolactam and lauryllactam. Polyamide mixtures can be used.

The number-average molar mass of the polyamide sequences is between 300 and 15,000 and preferably between 600 and 5000. The mass of the polyether sequences is between 100 and 6000 and preferably between 200 and 3000. It is preferred that the polyamide block to polyether block ratio is between 95:5 and 5:95 but more preferably between 90:10 and 50:50. Most preferably, the polyamide blocks and the polyether blocks of a single polymer have masses Mn of 1000/1000, 1300/650, 2000/1000, 2600/650 and 4000/1000, respectively, to optimize rigidity and flexibility as well as thermal processability.

The copolymers having polyamide blocks and polyether blocks may also include randomly distributed units. These block copolymers can be prepared by the simultaneous reaction of the polyether and of the precursors of the polyamide blocks.

For example, the polyetherdiol, a lactam (or an alpha-omega amino acid) and a chain-limiting diacid can be reacted in the presence of a small amount of water. A polymer is obtained which has essentially polyether blocks and polyamide blocks which are highly variable in length, but where the various reactants have also reacted randomly and are distributed statistically along the polymer chain. These polymers having polyamide blocks and polyether blocks, whether originating from the copolycondensation of polyamide and polyether sequences prepared beforehand or from a single-stage reaction, possess, for example, Shore D hardnesses which can be between 20 and 75 and advantageously between 30 and 70, and an intrinsic viscosity of between 0.8 and 2.5, measured in metacresole at 25 degrees C.

The polyether block can comprise polyalkoxylated compounds, which are well known in the art. These materials can include various polyether blocks such as polyethylene oxides, polypropylene oxides, polybutylene oxides, polytetramethylene oxides, polyoxyalkylene glycols such as polyoxyethylene glycol, polyoxypropylene glycol, polyoxytetramethylene glycol, the reaction products of polyalkoxylates with fatty acids, the reaction products of polyalkoxylates with fatty alcohols, the reaction products of polyalkoxylates with fatty acid esters of polyhydroxyl alcohols (for instance polyalkoxylate reaction products of fatty acids, of fatty glycols, of fatty sorbitols, of fatty sorbitans, and of fatty alcohols), or, interpolymers and mixtures thereof. The polyether chains in the suitable polyalkoxylated compounds are of the formula $(-OC_xH_{2x}-)_n$ wherein x is from 2 to about 8, wherein the alkyl group is straight or branched, and wherein n is from 2 to about 1000. Preferred polyether blocks are selected from the group consisting of polyethylene oxides, polypropylene oxides, polybutylene oxides, polytetramethylene oxides, polyethylene glycol, polypropylene glycol, polytetramethylene glycol, also referred to as polytetrahydrofuran, to afford ease of synthesis.

Where the polyether blocks derive from polyethylene glycol, from polyoxypropylene glycol or from polyoxytetramethylene glycol, either they are used as they are and subjected to copolycondensation with polyamide blocks having carboxyl ends, or they are aminated to convert them to polyetherdiamines and are subjected to condensation with polyamide blocks having carboxyl ends. They can also be mixed with polyamide precursors and a chain-limiting agent in order to produce polymers having polyamide blocks and polyether blocks, having units distributed statistically.

It would not be departing from the scope of the invention if the polyether blocks were to contain different units, such as units derived from ethylene glycol, from propylene glycol or else from tetramethylene glycol.

Preferably, the copolymer having polyamide blocks and polyether blocks comprises a single type of polyamide block and a single type of polyether block. Advantageously, copolymers having polyamide 12 blocks and polyethylene glycol blocks, and copolymers having polyamide 6 blocks and polyethylene glycol blocks ate employed. One can however also employ blends of polymers having polyamide blocks and polyether blocks.

Preferred polymers having polyamide and polyether blocks suitable for the present invention are disclosed in U.S. Pat. Nos. 6,203,920; 6,133,375; 6,120,790; 6,063,505; 6,051,649; 6,025,423; 6,018,015; 5,998,545; 5,830,983; 5,703,161; 5,637,407; 4,864,014; 4,331,786, 4,115,475, 4,195,015, 4,839,441, 4,864,014, 4,230,838; 4,332,920; and references therein and product literature for Pebax supplied by Elf Atochem.

The clay and the polyether block polyamide copolymer of the invention can be further incorporated in a matrix polymer. Such matrix polymers of the invention can be any polymer but preferred to be thermoplastic polymers, copolymers or interpolymers and mixtures thereof, and vulcanizable and thermoplastic rubbers.

Illustrative of useful thermoplastic polymers are polylactones such as poly(pivalolactone), poly(caprolactone) and the like; polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenyl-methane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl) propane) carbonate, and the like; polysulfones; polyether ether ketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenylene isophthalamide) (Nomex), poly(p-phenylene terephthalamide)(Kevlar), and the like; polyesters such as poly(ethylene azelate), poly(ethylene-1,5-naphthalate), poly(ethylene-2,6-naphthalate), poly(1,4-cyclohexane dimethylene terephthalate), poly (ethylene oxybenzoate) (A-Tell), poly(para-hydroxy benzoate) (Ekonol),poly(1,4-cyclohexylidene dimethylene terephthalate) (Kodel) (cis), poly(1,4-cyclohexylidene dimethylene terephthalate) (Kodel) (trans), polyethylene terephthlate, polybutylene terephthalate and the like; poly(arylene oxides) such as poly(2,6-dimethyl-1,4-phenylene oxide), poly(2,6-diphenyl- 1,4-phenylene oxide) and the like; poly (arylene sulfides) such as poly(phenylene sulfide) and the like; polyetherimides; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like; polyolefins such as (linear) low and high density poly(ethylene), poly(propylene), chlorinated low density poly(ethylene), poly(4-methyl-1-pentene), poly(ethylene), poly(styrene), and the like; ionomers; poly(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane), poly(dimethyl siloxane co-phenylmethyl siloxane), and the like; protein plastics; polyethers; polyimides; polyvinylidene halides; polycarbonates; polyphenylenesulfides; polytetrafluoroethylene; polyacetals; polysulfonates; polyester ionomers; polyolefin ionomers; Copolymers and mixtures of these aforementioned polymers can also be used.

Vulcanizable and thermoplastic rubbers useful in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly (sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton (RTM). Copolymers and mixtures of these aforementioned polymers can also be used.

Preferred thermoplastic matrix polymers for the present invention are thermoplastic polymers such as polyamides, polyimides, polystyrene, polyesters, polyolefins and polymers of alpha-beta unsaturated monomers and copolymers, because of their effectiveness in the present invention and their widespread applications.

Polyamides, which may be used in the present invention, are synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR$^1$COHNR$^2$— in which R$^1$ is an alkylene group of at least 2 carbon atoms, preferably from about 2 to about 11 or arylene having at least about 6 carbon atoms, preferably about 6 to about 17 carbon atoms; and R$^2$ is selected from R$^1$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6),poly (hexamethylene sebacamide) (nylon 6, 10), poly(hexamethylene isophthalamide), poly(hexamethylene terephthalamide), poly(heptamethylene pimelamide) (nylon 7,7), poly (octamethylene suberamide) (nylon 8,8), poly (nonamethylene azelamide) (nylon 9,9) poly (decamethylene azelamide) (nylon 10,9), poly(decamethylene sebacamide) (nylon 10,10), poly(bis(4-aminocyclohexyl)methane-1,10-decane-carboxamide)), poly(m-xylylene adipamide), poly(p-xylene sebacamide), poly(2,2,2-trimethyl hexamethylene terephthalamide), poly(piperazine sebacamide), poly(p-phenylene terephthalamide), poly (metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly(11-aminoundecanoic acid) (nylon 11), poly (12-aminododecanoic acid) (nylon 12) and the like.

Preferred polyamides for use in the practice of this invention include poly(caprolactam), poly(12-aminododecanoic acid), poly(hexamethylene adipamide), poly(m-xylylene adipamide), and poly(6-aminohexanoic acid) and copolymers and/or mixtures thereof, for their widespread application.

Other polymers, which may be employed in the process of this invention, are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters including crystalline and amorphous polyesters, having wide variations in physical properties are suitable for use in the process of this invention.

The particular polyester chosen for use can be a homopolyester or a co-polyester, or mixtures thereof as desired. Polyesters are normally prepared by the condensation of an organic dicarboxylic acid and an organic diols, and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly(cyclohexlenedimethylene), terephthalate) poly(ethylene dodecate), poly(butylene terephthalate), poly(ethylene naphthalate), poly(ethylene(2, 7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol), poly(ethylene oxybenzoate) (A-tell), poly(ethylene isophthalate), poly(tetramethylene terephthalate), poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel) (cis), and poly(1,4-cyclohexylene dimethylene terephthalate (Kodel) (trans). Polyester compounds prepared from the condensation of a diol and an aromatic dicarboxylic acid are preferred for use in this invention.

Illustrative of such useful aromatic carboxylic acids are terephthalic acid, isophthalic acid and a o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3 -trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor, because it leads to polyesters that are less prone to degradation during melt processing and more dimensionally stable.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and mixtures thereof. Among these polyesters of choice, poly(ethylene terephthalate) is most preferred, because of its excellent mechanical strength and manufacturability.

Another set of useful thermoplastic polymers are formed by polymerization of alpha-beta-unsaturated monomers of the formula:

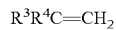

$$R^3R^4C=CH_2$$

wherein: $R^3$ and $R^4$ are the same or different and are cyano, phenyl, carboxy, alkylester, halo, alkyl, alkyl substituted with one or more chloro or fluoro, or hydrogen. Illustrative of such preferred polymers include polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, styrene and the like. Copolymers and mixtures of these aforementioned polymers can also be used in the present invention.

Preferred thermoplastic polymers formed by polymerization of alpha-beta-unsaturated monomers for use in the practice of this invention are poly(propylene), poly(ethylene), poly(styrene) and copolymers and mixtures thereof, with poly(propylene) polymers and copolymers being most preferred for their low cost and good mechanical and surface properties.

In order to ensure homogenous distribution of the various phases in the article of the invention, use of suitable compatibilizers may be made. These compatibilizers achieve compatibility between the inorganic phase and the polymeric phase as well as between two or more dissimilar polymeric phases.

In the realm of clay-polymer compatibility, effective compatibilizers facilitate delamination of the clay particles and prevent their reaggregation in the matrix polymer. This can be achieved through the careful selection and incorporation of compatibilizing or coupling agents, which consist of a portion which bonds to the surface of the clay and another portion which bonds or interacts favorably with the polymer. Such interactions can include transesterfication, in case of a polyester based matrix polymer. Compatibility between the polymeric phase and the clay particles ensures a favorable interaction, which promotes the dispersion of the intercalated clay in the polymeric phase. Effective compatibilzation leads to a homogenous dispersion of the clay particles in the typically hydrophobic matrix polymer and an improved percentage of exfoliated or delaminated clay. Typical agents known in the art include general class of materials such as organosilane, organozirconate and organotitanate coupling agents.

In the realm of polymer-polymer compatibility, the compatibilizers control phase separation and polymer domain size so as to provide desirable optical properties, roughness. Compatibilizers particularly suitable for compatibilizing the polyether block polyamide copolymer and any matrix polymer are: polyethylene, polypropylene, ethylene/propylene copolymers, ethylene/butene copolymers, all these products being grafted with maleic anhydride or gycidyl methacrylate; ethylene/alkyl (meth)acrylate/maleic anhydride copolymers, the maleic anhydride being grafted or copolymerized; ethylene/vinyl acetate/maleic anhydride copolymers, the maleic anhydride being grafted or copolymerized; the two above copolymers in which anhydride is replaced fully or partly by glycidyl methacrylate; ethylene/(meth)acrylic acid copolymers and optionally their salts; ethylene/alkyl (meth)acrylate/glycidyl methacrylate copolymers, the glycidyl methacrylate being grafted or copolymerized, grafted copolymers constituted by at least one mono-amino oligomer of polyamide and of an alpha-mono-olefin (co)polymer grafted with a monomer able to react with the amino functions of said oligomer; Such compatibilizers are described in, among others, EP-A-0,342,066 and EP-A-0, 218,665 which are incorporated herein by reference. Most preferred compatibilizers are terpolymers of ethylene/methyl acrylate/glycidyl methacrylate and copolymers of ethylene/ glycidyl methacrylate as well as polyolefins, and polyolefins grafted with maleic anhydride, commercially available as Lotader and Orevac from Elf Atochem, or similar products. These compatibilizers are preferred because of their effectiveness at relatively low loading and availability.

In addition to materials described herein above, the present invention may include other optional addenda in any amount. Such optional addenda include nucleating agents, fillers, plasticizers, impact modifiers, chain extenders, colorants, lubricants, antistatic agents, thermally processable onium salts, pigments such as titanium oxide, zinc oxide, talc, calcium carbonate, barium sulfate, clay, etc., dispersants such as fatty amides, (e.g., stearamide), metallic salts of fatty acids, e.g., zinc stearate, magnesium stearate, calcium stearate, etc., dyes such as ultramarine blue, cobalt violet, etc., antioxidants, fluorescent whiteners, ultraviolet absorbers, fire retardants, polymeric or inorganic matte particles or roughening agents, such as silica, titanium dioxide, talc, barium sulfate, and alumina, cross linking agents, voiding agents and the like. These optional components and appropriate amounts are well known in the art and can be chosen according to need.

Of these optional components, thermally processable onium salts, such as those described in U.S. Ser. No. 10/133,836 and references therein, at a level between 0.1–15 weight % of the polyether block polyamide copolymer, are preferred. Also preferred are pigments and particles, such as those selected from the group consisting of silica, titanium dioxide, talc, barium sulfate, and alumina, with a preferred particle size in the range of 0.2 µm to 10 µm.

The clay and the polyether block polyamide copolymer of the invention can be interacted for intercalation by any suitable means known in the art of making nanocomposites. For example, the clay can be dispersed in suitable monomers or oligomers, which are subsequently polymerized. Alternatively, the clay can be melt blended with the polyether block polyamide copolymer, oligomer or mixtures thereof at temperatures preferably comparable to their melting point or above, and sheared.

In another method, the clay and the polyether block polyamide copolymer can be combined in a solvent phase to achieve intercalation, followed by solvent removal through drying. Of the aforesaid methods, the one involving melt blending is preferred, for ease of processing.

In a preferred embodiment of the invention the clay, together with any optional addenda, is melt blended with the polyether block polyamide copolymer of the invention in a suitable twin screw compounder, to ensure proper mixing. An example of a twin screw compounder used for the experiments detailed below is a Leistritz Micro 27. Twin screw extruders are built on a building block principle. Thus, mixing of additives, residence time of resin, as well as point of addition of additives can be easily changed by changing screw design, barrel design and processing parameters. The Leistritz machine is such a versatile machine. Similar machines are also provided by other twin screw compounder manufacturers like Werner Pfleiderrer, and Berstorff. which can be operated either in the co-rotating or the counter-rotating mode. The Leistritz Micro 27 compounder may be operated in the co-rotating or the counter rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives then screw design needs to be appropriately configured. The preferred mode of addition of clay to the polyether block polyamide copolymer is through the use of the side stuffer, to ensure intercalation of the clay through proper viscous mixing and to ensure dispersion of the filler through the polymer matrix as well as to control the thermal history of the additives. In this mode, the polyether block polyamide copolymer is fed using the main resin feeder, and is followed by the addition of clay through the downstream side stuffer. Alternatively, the clay and block copolymer can be fed using the main feeders at the same location.

In yet another embodiment of the invention, the clay, the polyether block polyamide copolymer and the matrix polymer together with any optional addenda are melt blended in a suitable twin screw compounder. One of the preferred modes of addition of clay and the polyether block polyamide copolymer to the matrix polymer is by the use of side stuffers to ensure intercalation of the clay through proper viscous mixing; the polyether block polyamide copolymer first followed by the addition of clay through the downstream side stuffer or vice versa. Alternatively, the clay and the polyether block polyamide copolymer are premixed and fed through a single side stuffer. This method is particularly suitable if there is only one side stuffer port available, and also there are limitations on the screw design. Also preferred are methods where the clay and block copolymer are fed using the main feeders at the same location as the matrix resin.

In another preferred embodiment of the invention, the clay, together with any optional addenda, is melt blended with the polyether block polyamide copolymer of the invention using any suitable mixing device such as a single screw compounder, blender, mixer, spatula, press, extruder, molder, etc.

Any method known in the art including those mentioned herein above can be utilized to form an article of the invention comprising clay, polyether block polyamide copolymer and optional matrix polymer and other addenda. Such methods of formation include but are not limited to extrusion, co-extrusion with or without orientation by uniaxial or biaxial, simultaneous or consecutive stretching, blow molding, injection molding, lamination, solvent casting, coating, drawing, spinning, etc.

The article of the invention can be of any size and form, such as sheet, rod, particulate, powder, fiber, wire, tube, woven, non-woven, support, layer in a multilayer structure, and the like. The article of the invention can be used for any purpose such as packaging, woven or non-woven products, protective sheets or clothing, medical implement, sports articles such as golf balls or clubs.

In one preferred embodiment of the invention, the clay intercalated with the polyether block polyamide copolymer is incorporated in the base of an imaging member. Such imaging members include those utilizing photographic, electrophotographic, electrostatographic, photothermographic, migration, electrothermographic, dielectric recording, thermal dye transfer, inkjet and other types of imaging. A more preferred application of the invention is in the base of photographic imaging members, particularly photographic display products including reflective print media.

Typical bases for imaging members comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers and microporous materials, fabric, etc. The material of the invention comprising the clay intercalated with the polyether block polyamide copolymer can be incorporated in any of these materials and/or their combination for use in the base of the appropriate imaging member. In case of a multilayered imaging member, the aforementioned material of the invention can be incorporated in any one or more layers, and can be placed anywhere in the imaging support, e.g., on the topside, or the bottom side, or both sides, and/or in between the two sides of the support. The method of incorporation can include extrusion, co-extrusion with or without stretching, blow molding, casting, co-casting, lamination, calendering, embossing, coating, spraying, molding, and the like. The image receiving layer, as per the invention, can be placed on either side or both sides of the imaging support.

In one embodiment of the invention, the clay intercalated with the polyether block polyamide copolymer is incorporated in the base of an imaging member to provide antistatic characteristics to the imaging member. In such applications, the clay intercalated with the polyether block polyamide copolymer, imparts a surface electrical resistivity (SER) of $<10^{13}$ ohms/square, and preferably between $10^8$ and $10^{12}$ ohms/square to the base.

The imaging support of the invention comprising the clay intercalated with the polyether block polyamide copolymer may be formed by extrusion and/or co-extrusion, followed by orientation, as in typical polyester based photographic film base formation. Alternatively, the material of the invention comprising the clay intercalated with the polyether block polyamide copolymer can be extrusion coated onto another support, as in typical resin coating operation for photographic paper. Yet in another embodiment, the material of the invention comprising the clay intercalated with the polyether block polyamide copolymer can be extruded or co-extruded, preferably oriented, into a preformed sheet and subsequently laminated to another support, as in the formation of typical laminated reflective print media.

In a preferred embodiment, the material of this invention is incorporated in imaging supports used for image display such as reflective print media including papers, particularly resin-coated papers, voided polymers, and combinations thereof. Alternatively, the imaging support may comprise a combination of a reflective medium and a transparent medium, in order to realize special effects, such as day and night display. In a preferred embodiment, at least one layer comprising the material of the present invention is incorporated in a support comprising paper, because of its widespread use. In another preferred embodiment, at least one layer comprising the nanocomposite of the present invention is incorporated in an imaging support comprising a voided polymer, because of its many desirable properties such as tear resistance, smoothness, improved reflectivity, metallic sheen, day and night display usage, and the like.

The imaging support of the invention can comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

Besides application in imaging members, the clay intercalated with the polyether block polyamide copolymer can have numerous other applications, such as medical implements like catheters (vide, for example, U.S. Pat. No. 6,251,128), balloons (vide, for example, U.S. Pat. No. 6,221,042), etc., grooming products such as shaving razors (vide, for example, U.S. Pat. No. 6,308,416), sports items such as golf balls (vide, for example, U.S. Pat. No. 6,183,382), running shoes, and the like. In any known application of the polyether block polyamide copolymer, the present invention can provide further improvement by way of improved modulus, among other physical property enhancements. The clay intercalated with the polyether block polyamide copolymer when incorporated in an article of the invention, can increase the Young's modulus of the copolymer and/or any matrix polymer, by more than 10%, preferably by more than 20% and more preferably by more than 50%, as per the present invention.

The weight ratio of the clay: polyether block polyamide copolymer can vary according to need. It is preferred that the aforesaid weight ratio is maintained between 1:99 to 99:1, and more preferably between 3:97 and 95:5, to accommodate a variety of usage.

When the clay particles intercalated with the polyether block polyamide copolymer are further dispersed in a matrix polymer, the weight ratio of the clay: matrix polymer can vary between 0.1:99.9 and 80:20, but is preferred to be between 1:99 and 50:50 and more preferred to be between 3:97 and 20:80. The matrix polymer comprises between 20 and 99.9% by weight of any article of the present invention. Such a preferred range of composition will ensure improvement in physical properties as well as ease of processing.

The following examples illustrate the practice of this invention. They are not intended to be exhaustive of all possible variations of the invention. Parts and percentages are by weight unless otherwise indicated.

EXAMPLES

The clays used in the following samples are: Closite Na, which is a natural montmorillonite and Cloisite 25A, Cloisite 20A, Cloisite 15A and Cloisite 6A, which are montmorillonite-based organoclays (all from Southern Clay Products). The polyether block polyamide copolymer used is Pebax MV 1074 supplied by Elf Atochem, and is likely to comprise a polyamide 12 based block and a polyethylene glycol ether segment. The matrix polymer, when used, is poly(ethylene terephthalate), henceforth to be referred to as PET.

The clay and polymer(s) are weighed and combined at temperatures above the melting point of the polymer(s), in an internal batch mixer such as a Brabender, or in a twin-screw compounder such as the one made by Leistritz, or Werner-Pfleiderer or in a glass vessel using a spatula. The clay and polymer(s) can be premixed before heating or the polymer(s) can be melted first followed by addition of clay. An alternative method is to add clay during heating.

The (001) basal plane spacing of clay for selected samples is measured by X-ray diffraction (XRD) using a Rigaku Bragg-Brentano diffractometer utilizing a monochromator tuned to CuKα radiation. For comparison, the (001) basal plane spacing of dry clay, without any polymer, is measured and tabulated below in Table 1.

TABLE 1

| Dry clay | Clay type | (001) spacing |
| --- | --- | --- |
| Cloisite Na | natural | 10 Å |
| Cloisite 25A | organoclay | 21 Å |
| Cloisite 20A | organoclay | 25 Å |
| Cloisite 15A | organoclay | 32 Å |
| Cloisite 6A | organoclay | 34 Å |

Sample Ex. 1 is prepared by weighing a predetermined amount of Pebax in a glass container. The Pebax is melted and a predetermined amount of Cloisite Na is added, mixed with a spatula, heated on a hotplate, then mixed again with a spatula and cooled to ambient temperature. An aliquot of Ex. 1 in the solid state is placed between two polytetrafluoroethylene or polyimide sheets then pressed using a Carver press, with heated plates held at 204° C. The resulting film sample is analyzed by XRD for (001) basal plane spacing. This method of film sample preparation is adopted for XRD measurement for all the following samples.

Samples Ex. 2–5 are each prepared in the Brabender unit by first melting predetermined amount of Pebax and then adding predetermined amount of an organoclay, namely Cloisite 25A, Cloisite 20A, Cloisite 15A or Cloisite 6A, respectively, followed by mixing.

Samples Ex. 6 and 7 are each prepared in the twin screw Werner-Pfleiderer compounder by feeding dry blends of Cloisite 25A and Pebax in appropriate ratios.

Samples Ex 8 is prepared in the Leistritz compounder by feeding appropriate amounts of Pebax through the main feeder and the Cloisite Na downstream through the side stuffer.

Comparative sample Comp.A is prepared in a similar fashion in the Leistritz compounder by feeding PET through the main feeder and the Cloisite Na downstream through the side stuffer. In sample Comp. A no Pebax is used.

Sample Ex. 9 is prepared in the Leistritz compounder by feeding PET through the main feeder and a dry blend of Pebax and Cloisite 25A downstream through the side stuffer.

Details about the composition, melt-processing and the clay (001) basal plane spacing of samples Ex. 1–9 and comparative sample Comp.A are listed in Table 2 below.

When the data from Table 1 and 2 are compared, it is amply clear that all the samples Ex.1–9, prepared in accordance with the present invention, result in intercalation of the clay by Pebax, as evidenced by increased (001) spacing. It is also clear that natural clays as well as organoclays are intercalated by Pebax. It is further clear that the intercalated clay of the invention can be derived by any number of melt-processing methods known in the art. Moreover, it is clear that intercalated clay of the invention can be derived in a matrix polymer such as PET only in the presence of Pebax (vide Ex.9), as stipulated by the present invention, but not in the absence of Pebax (vide Comp. A).

Surface electrical resistivity (SER) of a sheet prepared from a sample similar to Ex. 8 is measured with a Keithly Model 616 digital electrometer using a two point DC probe by a method similar to that described in U.S. Pat. No. 2,801,191 under ambient conditions. The SER is determined to be 8.9 log ohms/square, indicating the desirability of this material as an antistatic agent, with possible applications in any article, particularly those comprising imaging members.

The Young's modulus of sheets prepared from samples similar to Ex. 6 and 7 are measured using an Instron and compared with that of a sheet of just Pebax, without any intercalated clay. These results are tabulated in Table 3 below. It is amply clear that the sheets comprising interca-

TABLE 2

| Sample | Clay | Pebax | PET | Clay:Pebax:PET wt. ratio | Melt-processing Set-up | (001) Spacing |
|---|---|---|---|---|---|---|
| Ex. 1 | Cloisite Na | yes | none | 10:90:0 | Glass vessel & spatula | 18 Å |
| Ex. 2 | Cloisite 25A | yes | none | 2.5:97.5:0 | Brabender | 32 Å |
| Ex. 3 | Cloisite 20A | yes | none | 2.5:97.5:0 | Brabender | 38 Å |
| Ex. 4 | Cloisite 15A | yes | none | 2.5:97.5:0 | Brabender | 37 Å |
| Ex. 5 | Cloisite 6A | yes | none | 2.5:97.5:0 | Brabender | 37 Å |
| Ex. 6 | Cloisite 25A | yes | none | 5:95:0 | Werner Pfleiderer | 32 Å |
| Ex. 7 | Cloisite 25A | yes | none | 10:90:0 | Werner Pfleiderer | 32 Å |
| Ex. 8 | Cloisite Na | yes | none | 6:94:0 | Leistritz | 18 Å |
| Comp. A | Cloisite Na | none | yes | 10:0:90 | Leistritz | 10 Å |
| Ex. 9 | Cloisite 25A | yes | yes | 4:1.7:94.3 | Leistritz | 33 Å |

FIG. 1 represents the XRD pattern corresponding to the (001) basal plane spacing of clay for (A) Cloisite Na, a natural clay supplied by Southern Clay Products, and (B) a film sample (Ex. 1 of the invention) comprising 10% by weight of Cloisite Na and 90% by weight of Pebax MV 1074, a polyether block polyamide copolymer, supplied by Elf Atochem.

Figure 2:
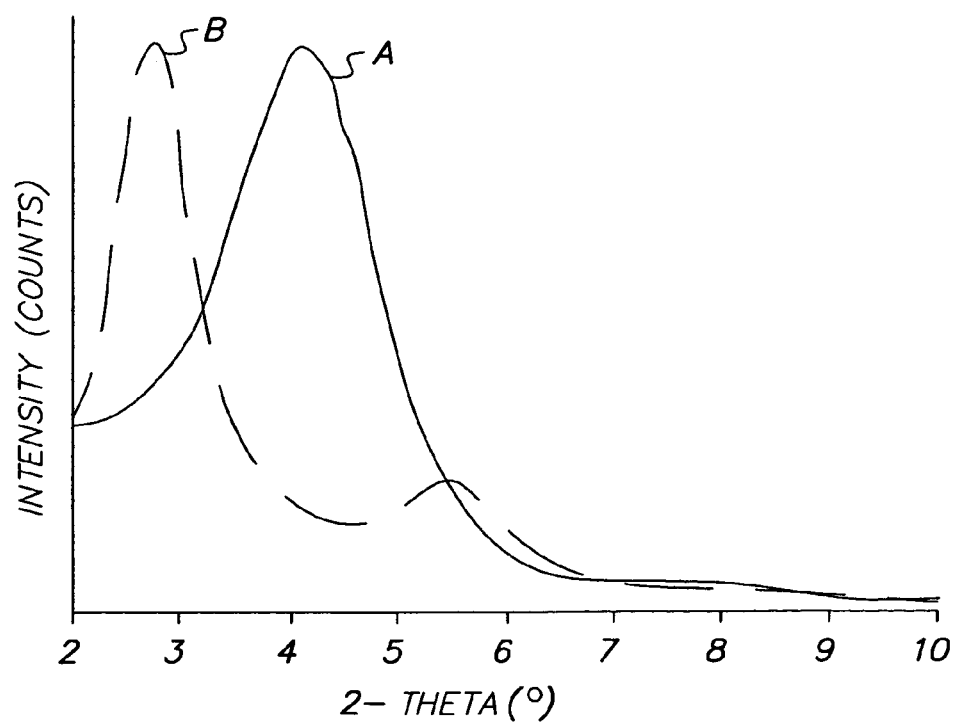
FIG. 2 represents the XRD pattern corresponding to the (001) basal plane spacing of clay for (A) Cloisite 25A and (B) a film sample (Ex. 7) comprising 10% of Cloisite 25A and 90% of Pebax.

FIG. 2 represents the XRD pattern corresponding to the (001) basal plane spacing of clay for (A) Cloisite 25A, an organoclay supplied by Southern Clay Products, and (B) a film sample (Ex. 7 of the invention) comprising 10% by weight of Cloisite 25A and 90% by weight of Pebax MV 1074.

In both FIGS. 1 and 2, the clay (001) XRD peak is significantly shifted towards lower 2-THETA (°) diffraction angle, in the presence of Pebax (FIGS. 1B and 2B), with respect to the corresponding clay peak, without any Pebax (FIGS. 1A and 2A) indicating increase in the clay basal plane spacing for the examples of the invention. Such an increase in clay (001) spacing results from intercalation of the clay by Pebax, in accordance with the present invention.

lated clay and Pebax, as examples of the present invention, are of significantly higher Young's modulus than a sheet of Pebax. Specifically, sheets comprising only 5% and 10% clay in accordance with the present invention are of more than 30% and 60% higher modulus, respectively, compared to just Pebax. This demonstrates the high desirability of the material of the invention for applications requiring improved mechanical properties.

TABLE 3

| Sheet composition | Young's modulus | Modulus improvement |
|---|---|---|
| Cloisite 25A: Pebax (wt. ratio) | MPa | % |
| 0:100 | 115.3 | 0 |
| 5:95 | 151.3 | 31 |
| 10:90 | 186.1 | 61 |

The invention has been described in detail with particular reference to certain preferred embodiments thereof, but it will be understood that variations and modifications in materials and processing can be effected within the spirit and scope of the invention.

What is claimed is:

1. An extruded base for an imaging element comprising a matrix polymer and an intercalated clay comprising clay intercalated with polyether block polyamide copolymer, wherein said matrix polymer comprises polyolefin or polyester.

2. The extruded base of claim 1 wherein said matrix polymer comprises poly(propylene).

3. The extruded base of claim 1 wherein said polyester comprises polyethylene terephthalate.

4. The extruded base of claim 1 wherein said polyester comprises crystalline polyester.

5. The extruded base of claim 1 wherein said polyester comprises amorphous polyester.

6. The extruded base of claim 1 wherein said extruded base further comprises compatibilizer.

7. The extruded base of claim 6 wherein said compatibilizer comprises polyolefins.

8. The extruded base of claim 1 wherein said extruded base has a surface resistivity of less than $10^{13}$ ohms per square.

9. The extruded base of claim 6 wherein said surface resistivity is between $10^8$ and $10^{12}$ ohms per square.

10. The extruded base of claim 1 wherein the Young's modulus of said extruded base comprising copolymer and matrix polymer is enhanced by at least 10%.

11. The extruded base of claim 1 wherein the Young's modulus of said extruded base comprising copolymer and matrix polymer is enhanced by at least 20%.

12. The extruded base of claim 11 wherein said matrix polymer comprises polyolefin and said polyolefin comprises between 20 and 99.9% by weight of said article.

13. The extruded base of claim 1 wherein said clay comprises smectite clay.

14. The extruded base of claim 1 wherein said clay comprises synthetic smectite clay.

15. The extruded base of claim 1 wherein the ratio by weight of clay to copolymer is between 1:99 and 99:1.

16. The extruded base of claim 1 wherein the polyether to polyamide molecular weight ratio is between 5:95 and 95:5.

17. The extruded base of claim 1 wherein said copolymer comprises blocks selected from the group consisting of polyamide 6, polyamide 12, polyethylene oxide, polyethylene glycol, polytetramethylene oxide, and polytetramethylene glycol.

18. The extruded base of claim 17 wherein in said polyether block comprises a structure

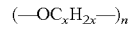

wherein x is from 2 to about 8, wherein the alkyl group is straight or branched, and wherein n is from 2 to about 1000.

19. The extruded base of claim 1 wherein said imaging member comprises a base for a photographic member.

20. The extruded base of claim 1 wherein in said polyamide block comprises the recurring unit represented by the general formula:

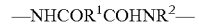

wherein $R^1$ is an alkylene group of at least 2 carbon atoms or arylene having at least 6 carbon atoms; and $R^2$ is selected from $R^1$ and aryl groups.

* * * * *

UNITED STATES PATENT AND TRADEMARK OFFICE
CERTIFICATE OF CORRECTION

PATENT NO. : 7,166,656 B2 Page 1 of 1
APPLICATION NO. : 10/008810
DATED : January 23, 2007
INVENTOR(S) : Debasis Majumdar et al.

It is certified that error appears in the above-identified patent and that said Letters Patent is hereby corrected as shown below:

Column 19, Line 22   In Claim 9, delete "claim 6" and insert --claim 8--, therefor.

Signed and Sealed this

Sixth Day of May, 2008

JON W. DUDAS
*Director of the United States Patent and Trademark Office*